No. 748,603. PATENTED JAN. 5, 1904.
F. B. HENRY.
BUILDING BLOCK.
APPLICATION FILED JAN. 10, 1903.
NO MODEL. 3 SHEETS—SHEET 1.

Witnesses  Inventor
Jos. H. Blackwood  Frank B. Henry
  by D. A. Gourick
  Attorney No. 748,603. PATENTED JAN. 5, 1904.
F. B. HENRY.
BUILDING BLOCK.
APPLICATION FILED JAN. 10, 1903.
NO MODEL. 3 SHEETS—SHEET 2.
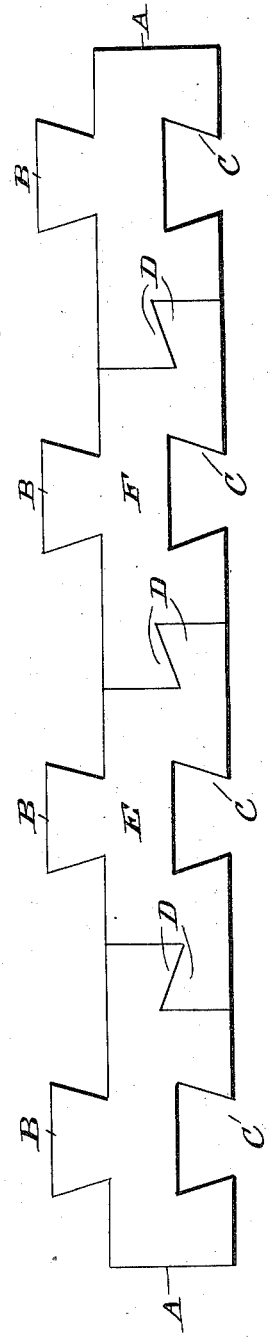
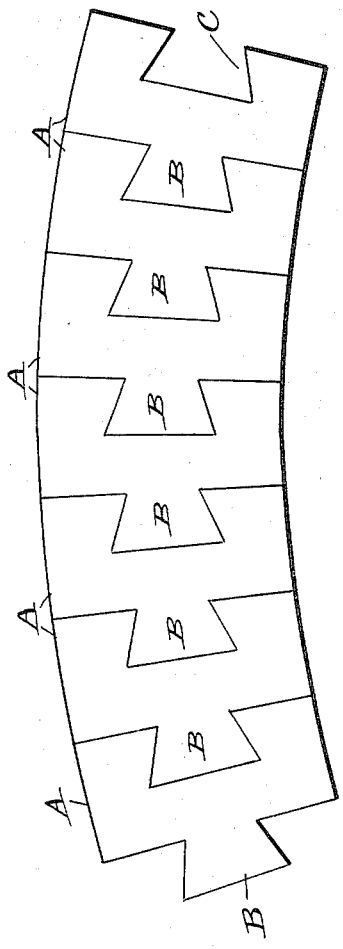
Witnesses
Inventor
Frank B. Henry
Attorney No. 748,603. PATENTED JAN. 5, 1904.
F. B. HENRY.
BUILDING BLOCK.
APPLICATION FILED JAN. 10, 1903.
NO MODEL. 3 SHEETS—SHEET 3.
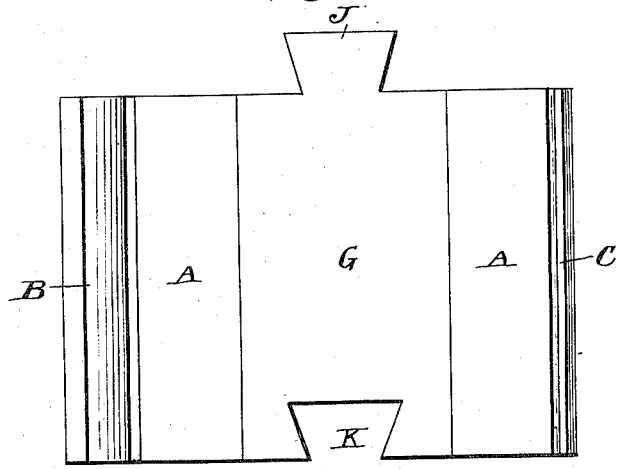
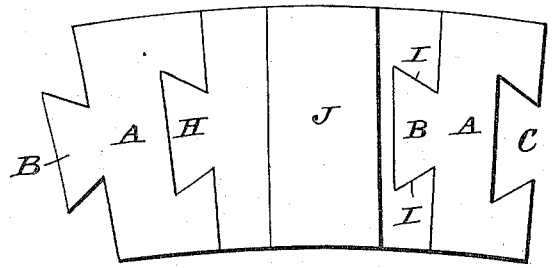
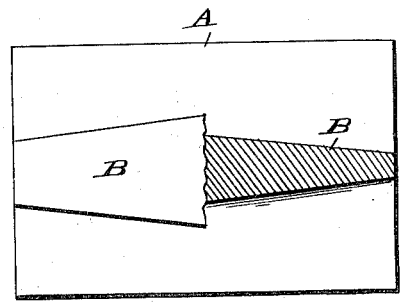
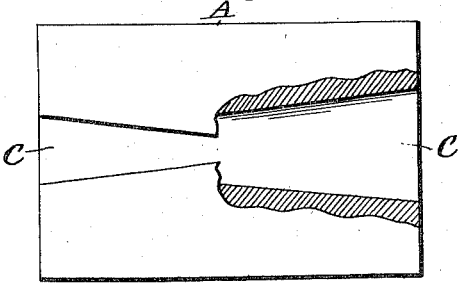
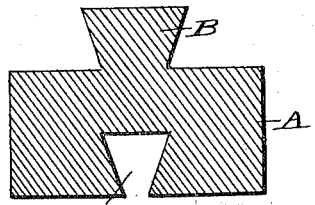
Witnesses Inventor
Frank B. Henry
Attorney No. 748,603. Patented January 5, 1904.

UNITED STATES PATENT OFFICE.

FRANK B. HENRY, OF PHILADELPHIA, PENNSYLVANIA.

BUILDING-BLOCK.

SPECIFICATION forming part of Letters Patent No. 748,603, dated January 5, 1904.

Application filed January 10, 1903. Serial No. 138,488. (No model.)

*To all whom it may concern:*

Be it known that I, FRANK B. HENRY, a citizen of the United States, residing at Philadelphia, in the county of Philadelphia and State of Pennsylvania, have invented certain new and useful Improvements in Building-Blocks, of which the following is a specification.

My invention relates to bricks or molded blocks for building purposes, and has for its object to provide a block having a dovetail on one side to fit into a groove on the other side of the next course of bricks and where more than one thickness of bricks are used in the wall to provide wings on the bottom and top, respectively, of the meeting edges, having their horizontal faces correspondingly beveled to bind the different layers of brick together.

The various features and advantages of my invention will more fully appear hereinafter and by reference to the accompanying drawings, in which—

Figure 1:
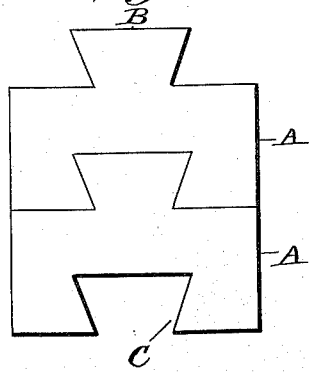
Figure 2:
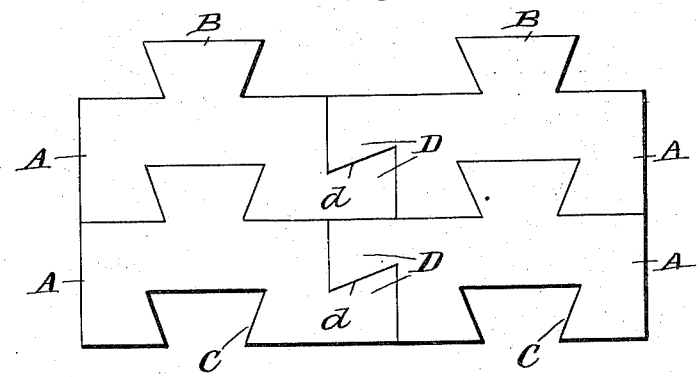
Figure 3:
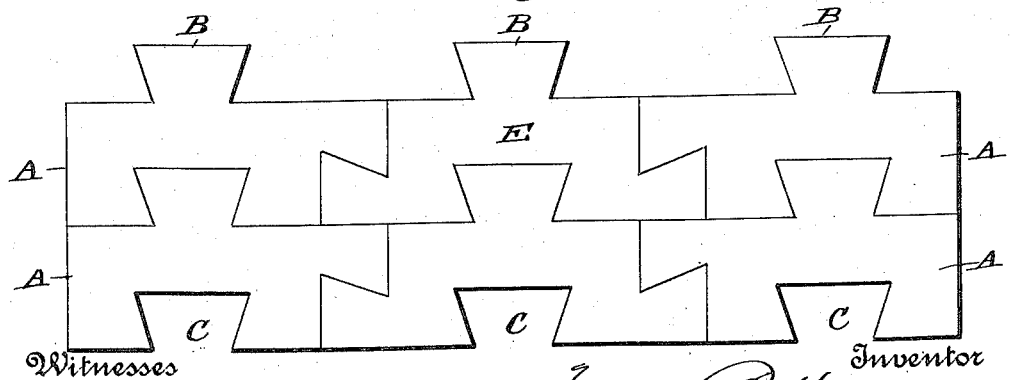

Figure 1 is a view of brick used in single-brick thickness constructions; Fig. 2, a section of wall, showing the bricks used in double-thickness constructions; Fig. 3, a section of wall, showing three-thickness construction; Fig. 4, a section of wall, showing four-thickness construction; Fig. 5, a portion of arch, showing the adaptability and utility of my invention in this class of work; Fig. 6, a vertical view of a portion of a chimney or column, showing a brick used for binding layers and sections of the chimney together; Fig. 7, a top plan view of a portion of the course of chimney; Fig. 8, a top view of a modification of brick shown in Fig. 1; Fig. 9, a bottom view of Fig. 8, and Fig. 10 a view in section of bricks shown in Figs. 8 and 9.

Referring to the drawings, in which similar letters of reference indicate corresponding parts throughout the several views, A represents the body portion of a brick having a dovetail B on one side and a groove C on the other side of the same shape as dovetail B to receive the dovetail on the adjacent course of brick in constructing the wall.

In Fig. 1 is shown the simplest form of my invention which is used in structures in which but a single block is used for the thickness of the wall or in which several blocks are used in the thickness of the wall, but it is unnecessary to bind the various layers together.

Where it is desirable to bind the various layers of the wall together, I provide wings D on the meeting edges of the blocks, having their horizontally-disposed meeting edges $d$ beveled, as shown in Figs. 2, 3, and 4. In Fig. 2 is shown the two-layer construction, in which the wing D is on the upper half of the edge of one brick and the bottom half of the edge of the other. In Fig. 3 is shown a three-brick-thickness construction, in which the bricks E used in the central tier or layer have a wing on the lower half of each meeting edge to bind with wings on the upper half of the meeting edges of the outside bricks, and in Fig. 4 a four-brick construction is shown, in which is introduced a brick F, having the wing on the lower half of one edge and the upper half of the other which is used in combination with the bricks shown in Fig. 5. It will be readily apparent that by employing brick F the thickness of the wall may be extended indefinitely.

In Figs. 8 and 9 is shown a modification of my invention in which the dovetail B is tapered longitudinally from the center to both ends and the groove C is tapered from the ends to the center. This structure is especially useful in walls where it is desired to break joints in the center of the abutting layers of bricks.

Fig. 5 shows the adaptability of my invention to the building of arches, underground conduits, &c., the bricks therein having one edge narrower than their opposite edges and the top of the dovetail and bottom of the groove beveled to correspond with the bevel on the top and bottom of the brick, which is governed by the curvature of the structure.

In Figs. 6 and 7 are shown views of a portion of a chimney or hollow column in which the bricks used in making arches shown in Fig. 5 are used in combination with a block G, having a dovetail H on one side and a groove I on the opposite side and a dovetail J on the upper edge and a groove K on the lower edge, said block G being used to bind the courses of bricks together.

Having thus described my invention, what I claim is—

In a building-block, a dovetail on the upper side tapered from the center to the ends, and a groove in the lower side tapered from the ends to the center, substantially as shown and described.

In testimony whereof I hereto affix my signature in the presence of two witnesses.

FRANK B. HENRY.

Witnesses:
EDWIN S. WARD,
GEO. C. WESTON.